(12) United States Patent
Disley

(10) Patent No.: US 8,757,807 B1
(45) Date of Patent: Jun. 24, 2014

(54) VEHICLE ADAPTATION TO AUTOMATIC DRIVER INDEPENDENT CONTROL MODE

(71) Applicant: Volvo Car Corporation, Gothenburg (SE)

(72) Inventor: Jonathan Disley, Kungalv (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/103,398

(22) Filed: Dec. 11, 2013

(30) Foreign Application Priority Data

Dec. 18, 2012 (EP) .................................. 12197626

(51) Int. Cl.
  *G03B 21/14* (2006.01)

(52) U.S. Cl.
  USPC .............................................. 353/13; 353/79

(58) Field of Classification Search
  USPC ........ 353/11–14, 79; 359/630, 452, 459, 461, 359/443, 13
  See application file for complete search history.

(56) References Cited

U.S. PATENT DOCUMENTS

| | | | |
|---|---|---|---|
| 6,108,031 A | 8/2000 | King et al. | |
| 6,577,355 B1 * | 6/2003 | Yaniv | 349/16 |
| 6,726,335 B2 * | 4/2004 | Yaniv et al. | 353/98 |
| 7,036,936 B2 * | 5/2006 | Hattori et al. | 353/13 |
| 7,126,583 B1 * | 10/2006 | Breed | 345/158 |
| 7,628,239 B1 | 12/2009 | Louie et al. | |
| 8,317,329 B2 * | 11/2012 | Seder et al. | 353/13 |
| 8,325,986 B2 * | 12/2012 | Schofield et al. | 382/104 |
| 2004/0193363 A1 | 9/2004 | Schmidt et al. | |
| 2008/0059007 A1 | 3/2008 | Whittaker et al. | |
| 2009/0319112 A1 | 12/2009 | Fregene et al. | |
| 2010/0106356 A1 | 4/2010 | Trepagnier et al. | |
| 2012/0173069 A1 * | 7/2012 | Tsimhoni et al. | 701/25 |
| 2012/0277947 A1 * | 11/2012 | Boehringer et al. | 701/23 |
| 2013/0222174 A1 | 8/2013 | Choe et al. | |

FOREIGN PATENT DOCUMENTS

| | | |
|---|---|---|
| DE | 10226451 | 7/2003 |
| DE | 20211819 | 12/2003 |
| DE | 102005020260 | 4/2006 |
| WO | 2008110654 | 9/2008 |
| WO | 2011042160 | 4/2011 |
| WO | 2012050305 | 4/2012 |

OTHER PUBLICATIONS

Extended European Search Report for EP 12197626.0, Completed by the European Patent Office on May 3, 2013, 9 Pages.

* cited by examiner

*Primary Examiner* — William C Dowling
(74) *Attorney, Agent, or Firm* — Brooks Kushman P.C.

(57) ABSTRACT

A road vehicle which may switch between a driver dependent mode in which the control of the vehicle is dependent on a driver located in the vehicle and a driver independent mode in which the control of the vehicle is independent of a driver. The vehicle includes an image projecting system for projecting a motion picture on an interior surface of the vehicle, and at least one window glass configurable to function as a screen for showing images projected by the image projecting system. When the vehicle is controlled in the driver independent mode, an area of the window glass is changed from readily transparent to the screen for showing images projected by the image projecting system either by a change in a property of the window glass or covering the area of the window glass by an image reflecting surface.

20 Claims, 2 Drawing Sheets

VEHICLE ADAPTATION TO AUTOMATIC DRIVER INDEPENDENT CONTROL MODE

CROSS-REFERENCE TO RELATED APPLICATIONS

This application claims foreign priority benefits under 35 U.S.C. §119(a)-(d) to European patent application number 12197626.0 filed Dec. 18, 2012, which is incorporated by reference in its entirety.

TECHNICAL FIELD

The present disclosure relates to a vehicle being able to switch between a driver controlled mode and a driver independent control mode. The driver independent control mode may for example be a mode in which the vehicle is remotely controlled, being set to follow a vehicle or being pre-programmed to follow a certain route provided with vehicle guiding markings. In particular, the disclosure relates to a system and method for providing a relaxing environment in the vehicle for the inactive driver and other passengers in the vehicle.

BACKGROUND

In recent years, there has been an increased interest in developing alternative driving control systems for vehicles intended for road traffic, e.g. cars, trucks or buses, which normally are controlled by a driver located in the vehicle. These alternative driving control systems will thus provide for vehicle control which may control speed, steering, braking etc. without any intervention of a driver located in the vehicle. These systems may be referred to by different names such as autonomous driving, driver independent control, remote driving control, coloning or route keeping control. The driver independent control mode may for example be a mode in which the vehicle is remotely controlled, the controlled vehicle is set to follow a leading vehicle, the vehicle being pre-programmed to follow a certain route provided with vehicle guiding marks or controlled by GPS and map data. Different systems for driver independent control of a vehicle may for example be found in WO 11/042,160, WO 12/050,305, WO 08/110,654, US 2009/319 112, US 2010/106 356, U.S. Pat. No. 7,628,239, US 2004/193 363, U.S. Pat. No. 6,108,031 or US 2008/059 007. The presence of a driver independent control system will thus allow the inactive driver to concentrate on other issues than controlling the vehicle, e.g. to read, to relax or watch a movie. The present disclosure is directed to make the journey relaxing for the driver while the vehicle is driven in a driver independent controlled mode.

SUMMARY

The present disclosure is directed to improved display possibilities for a projected motion picture inside a vehicle when it is driving in a driver independent control mode.

According to a first aspect of the disclosure is it directed to a road vehicle, e.g. a car, bus or truck, which may switch between a first, driver dependent, mode (I) in which the control of the vehicle is dependent on a driver located in the vehicle and a second, driver independent, mode (II) in which the control of the vehicle is independent of a driver located in the vehicle. Hence, the driver needs not to be in the vehicle for managing control of the vehicle in the second, driver independent mode. However, it may be possible to include the feature that a driver located in the vehicle may overrule the automatic drive control system if desired, e.g. to set a lower speed or in some other way influence the control of the vehicle. By driver independent mode, or autonomous mode, is thus meant a driving mode in which the vehicle may be controlled without any interaction from a driver located in the vehicle even though a driver located in the vehicle may be allowed to interfere with the vehicle control. The vehicle is provided with an image projecting system for projecting a motion picture on an interior surface of the vehicle in order to provide a relaxing and/or amusing environment for passengers in the vehicle. Such image viewing systems in a vehicle are known per se from for example DE102 26 451, DE 10 2005 020 260 or DE 202 11 819.

The autonomous driving feature of the vehicle provides for certain possibilities which may be used. When the vehicle is controlled in the second driver independent mode (II) is it enabled that an area corresponding to at least one window glass of the vehicle is changed from being readily transparent to function as a screen for showing images projected by the image projecting unit. The vehicle is thus provided with a feature enabling a window glass, or the area corresponding to the area of the window glass, to change its normal function from being transparent and allowing a driver or passenger in the vehicle to see the outside through the window to reduce or block the transparency of the window while changing the function of the area corresponding to the window to serve as a screen. The change of function of the glass window may either be effectuated by changing the properties of the window glass or by covering the area corresponding to the window glass by an image reflecting surface.

A certain benefit to use this system for a vehicle provided with an autonomous mode is that a window glass area which normally must be transparent for a driver of the vehicle in order to readily control the vehicle may be used as a screen when the vehicle is driving in the driver independent mode, e.g. may the front windshield window glass area be used as a screen for projected images. Since this area normally represents a viewing field which is the best viewing field for a driver located in a driver's seat is it also considered to normally be the best place for placing a screen in order to show a motion picture, or any other images projected, for an inactive driver.

In this context has the expression "an area corresponding to a window glass" been used for the instance that the change of the function of the window from being readily transparent to function as a screen is made by covering the window area with a sheet material, preferably a reflective, low transparent material. In this case is the size and shape of the material preferably such that it covers at least the complete window surface defined by the frames in order to provide a sharp picture without disturbing light shining through at the edges. However, if it is acceptable to allow light to enter through the window glass, the screen made by the sheet material could also be somewhat smaller than the actual area, e.g if it is considered to be relevant to be able to at least get a glimpse of the outside from the vehicle through the window. Likewise, if the properties of the window glass is changed, e.g. by changing a structure comprised within the glass or a film adhered onto the surface of the glass, is also this area preferably corresponding to the area of the glass window which is located within the window frame.

There are several known ways of changing the transparency of a glass window, e.g. there are known methods which change the transparency due to light or temperature changes. These methods are not considered suitable for this purpose since the transparency may thus be influenced in an undesired way by ambient conditions. It is therefore suggested that the properties of the glass window will change due to a change of an electric voltage and/or current applied to a transparency reducing means in the window glass. The properties of the glass may thus be changed in a manner which is easier to control. The transparency reducing means in the window glass may for example be a LCD glass or screen which is transparent when no current/voltage is applied thereto and changes to be less transparent when a voltage is applied to the transparency reducing means. Likewise, electrochromic films or micro-mechanical mirrors which change the transparency properties of the window glass in dependence of a voltage applied may also be used. The transparency changing means may be completely integrated in the window glass or may be a film or the like applied to the surface of the glass such that it will form an integrated part of the window on its surface. The proposed alternatives above are suitable for changing the transparency properties of the window glass but other systems capable of being controlled, electrically or by other means, may of course also be used as long as the transparency may be controlled efficiently.

Instead of changing the properties of the window glass may the area corresponding to the window be covered by a screen and thus change the function of the window from being readily transparent in order to view the outside to reflect images produced by the image projecting system. The screen is preferably made of a flexible sheet material such that the screen may be stored in a space saving manner, e.g. folded or rolled up, when not in use. The screen could also slide and be stored in or close to the roof when not placed in front of a window and in this case could a more rigid sheet material be used. Said change of an area corresponding to a window glass of the vehicle to function as a screen could of course include any window glass of the vehicle, e.g. the front side windows and/or the rear side windows. In this case could it be possible to store a separate screen for a side window in the door in the same manner as the window glass is stored in the door when the window glass is lowered. The feature of locating the sheet material in an area corresponding to a window glass in order to serve as a screen may be made automatically, e.g. by a motor rolling down a rolled up sheet material and stored in the roof above the window glass, in response to control signals.

The vehicle may be provided with a function such that said change of an area corresponding to a window glass from being readily transparent to function as a screen is made automatically when the vehicle driving mode is changed from its first, driver dependent, mode (I) to its second, driver independent, mode (II). Alternatively may the change of an area corresponding to a window glass from being readily transparent to function as a screen be restricted when the vehicle is in its first, driver dependent mode (I) and be controlled manually when the vehicle is in its second, driver independent mode (II). These systems may of course also be combined such that some windows, or window areas, are automatically changed to function as screens while other windows need a manual control signal in order to change its function.

Hence, it may be desired that several areas corresponding to a window glass change from being readily transparent to function as screens. For instance, the front windshield window, front side windows and rear side windows may all be modified to function as screen areas. In this case may these separate areas function as separate screens showing the same or separate motion pictures, e.g. the same or different movies. These areas could also be used to define a single, larger screen. For instance, the side windows and front window could be used together with the roof to form a large concave or semi-spherical screen. In this case may the roof either be originally shaped and designed to function as a screen or be modified to function as a screen area when the vehicle driving mode changes. In case there are areas located in between the mentioned screen areas, e.g. the A-pillar or B-pillar, may these intermediate areas also be included in the screen area such that there will be no dead spots between the screens. In the case that one or several separate sheets are used for the screens covering the window areas may these sheets be designed such that they will overlap intermediate structures between the window areas such that essentially the entire interior of the upper part of the vehicle forms a continuous screen. In case there is a change of the window glass itself to function as a screen, intermediate structures may be designed or modified to function as screen area.

In one embodiment of the disclosure is the image projecting system designed and controlled to project a first motion picture on the major part of the screen formed at the area corresponding to the front windshield window glass and a second motion picture on a small area of the front windshield screen. This second motion picture may display a real time forward view of the outside of the vehicle. In this case is the view preferably taken from a camera located outside the vehicle chassis at the front or at the lower part of the window glass. It could of course also be possible to place the camera inside the vehicle and allow a small part of the windshield window to be transparent and the backside of the camera, which preferably is located close to the windshield glass, could be used as screen area. This outdoor view may be present as a small picture in the lower right corner of the screen. The outdoor view could of course be replaced with any other images, e.g. could a map and/or GPS be visualized in this small part of the screen. The image projecting system could also cooperate with an existing Head Up Display which normally is used for displaying vehicle data on the windshield and use it for displaying vehicle data or other images in the small picture frame.

BRIEF DESCRIPTION OF THE DRAWINGS

The objects and advantages of the present disclosure will be further clarified in the following description and appended claims and also shown on the accompanying drawings in which:

DETAILED DESCRIPTION

As required, detailed embodiments are disclosed herein. However, it is to be understood that the disclosed embodiments are merely exemplary and that various and alternative forms are possible. The figures are not necessarily to scale and features may be exaggerated or minimized to show details of particular components. Therefore, specific structural and functional details disclosed herein are not to be interpreted as limiting, but merely as a representative basis for teaching one skilled in the art.

Figure 1:
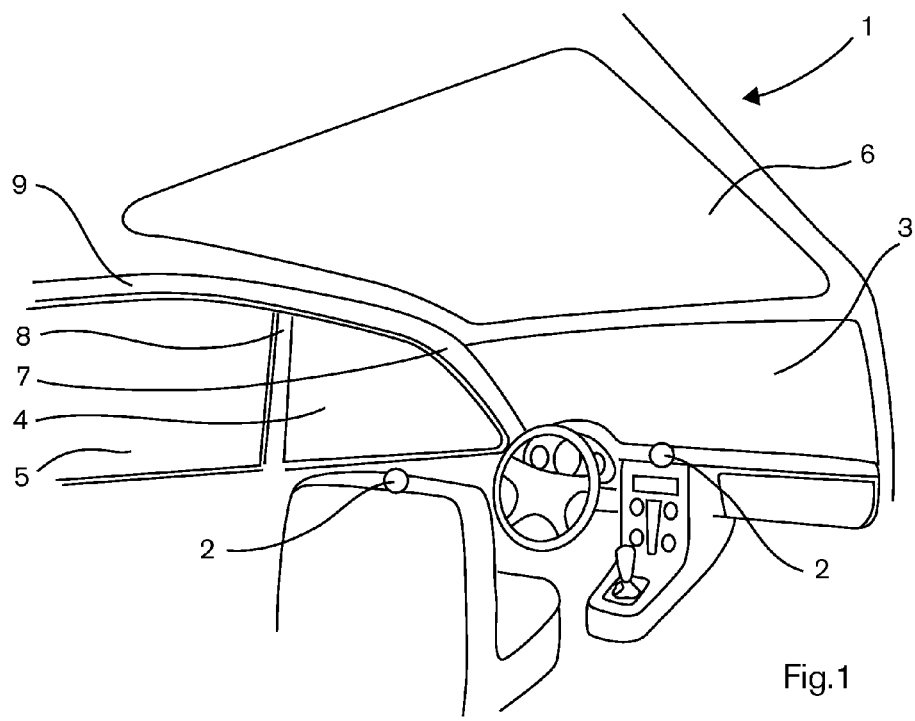
FIG. 1 discloses a view of the interior of a vehicle in its first, driver dependent, mode FIG. 2 discloses a view of the interior of a vehicle in its second, driver independent, mode (II) having modified surfaces to be used as screens FIG. 3 discloses a view of the interior of a vehicle in its second, driver independent, mode (II) when using several modified surfaces as a single screen FIG. 4 discloses a view of the interior of a vehicle in its second, driver independent, mode using a small screen area of the front windshield glass for projecting an outdoor forward view

In FIG. 1 is disclosed an interior of a vehicle 1. The vehicle is provided with an image projecting system 2 represented by cameras located on top of the backrest of a driver's seat and close to a windshield window 3 in the centre line of the vehicle 1. There may of course be additional cameras or other image projecting devices present in the vehicle 1 in order to be able to provide the desired images onto desired surfaces of the interior of the vehicle 1. There is further a front side window glass 4, a rear side window glass 5 and a roof 6 which represents rather large areas of the interior of the vehicle. These areas are divided by intermediate structures such as an A-pillar 7, located between the front windshield window 3 and the front side window 4. A B-pillar 8 is located between the front side window glass 4 and rear side window glass 5 and a side roof pillar 9 is located between the roof 6 and the side windows 4, 5. The vehicle in FIG. 1 is shown when the window glasses 3, 4, 5 are configured to be used for normal purpose, i.e. for viewing of the outside of the vehicle 1 through a readily transparent surface. This is the normal case when the vehicle is controlled in its first, driver dependent, mode (I). It may be possible that the rear side window glass 5 could be changed from being readily transparent to function as a screen for showing images projected by the image projecting unit, either by changing the properties of the window glass 5 or by covering the area corresponding to the window glass 5 by an image reflecting surface, in the first, driver dependent, mode (I). It may also be possible that the roof 6 is designed to always be suitable to be used as a screen surface. However, due to legal restrictions, and common sense, should not the front windshield glass 3 or front side window glass 4 change its state to provide a non-transparent screen when the vehicle is in its first, driver dependent mode (I) to have a reduced transparency and function as screens. In this Figure, and the following FIGS. 2-4, is only one side of the vehicle 1 shown but it is of course the intention of the disclosure that also the corresponding side windows on the other side of the vehicle 1 also may change its properties to function as screens.

Figure 2:
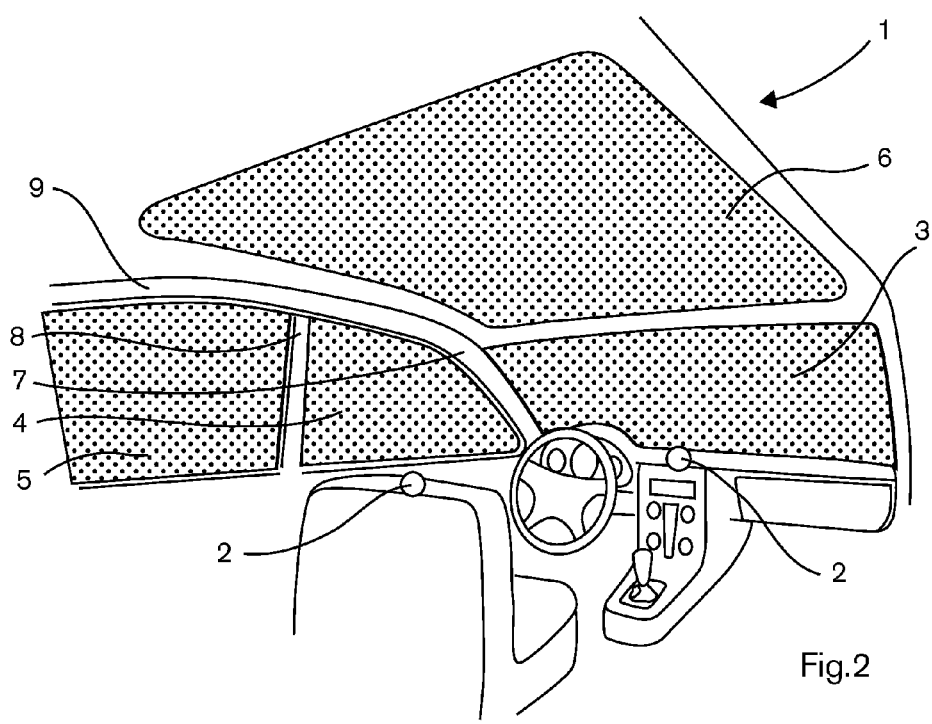

In FIG. 2 is shown when the surfaces corresponding to windshield window glass 3, front side window glass 4 and rear side window glass 5 has changed from being readily transparent to provide a reflective screen surface which is indicated by showing these parts with dots. In this figure is it also indicated that the roof 6 is configured to function as an image reflective surface. In this case are not the intermediate structures, e.g. the A-pillar 7, B-pillar 8 or side roof pillar 9, indicated to form part of the screen areas. To include also intermediate structures in the screen could of course be possible by designing these structures to be a suitable surface for reflecting projected images and thus work as an integrated part together with the other screen surfaces to provide a single, concave screen including the side and front window areas together with the roof. Alternatively, a screen forming material, e.g. flexible sheets, may be used and located such that they will cover both the window glasses 3,4,5 and intermediate structures 7,8,9 so as to form a single, continuous screen together with the roof 6. The screen surfaces 3,4,5,6 could of course be used such that the same or different movies or pictures are shown on each screen, e.g. "movie 1" may be shown on the area corresponding to the front windshield window 3 while "movie 2" is shown on the area corresponding to the rear side window 5 and a relaxing movie showing an aquarium is shown on the roof 6.

Figure 3:
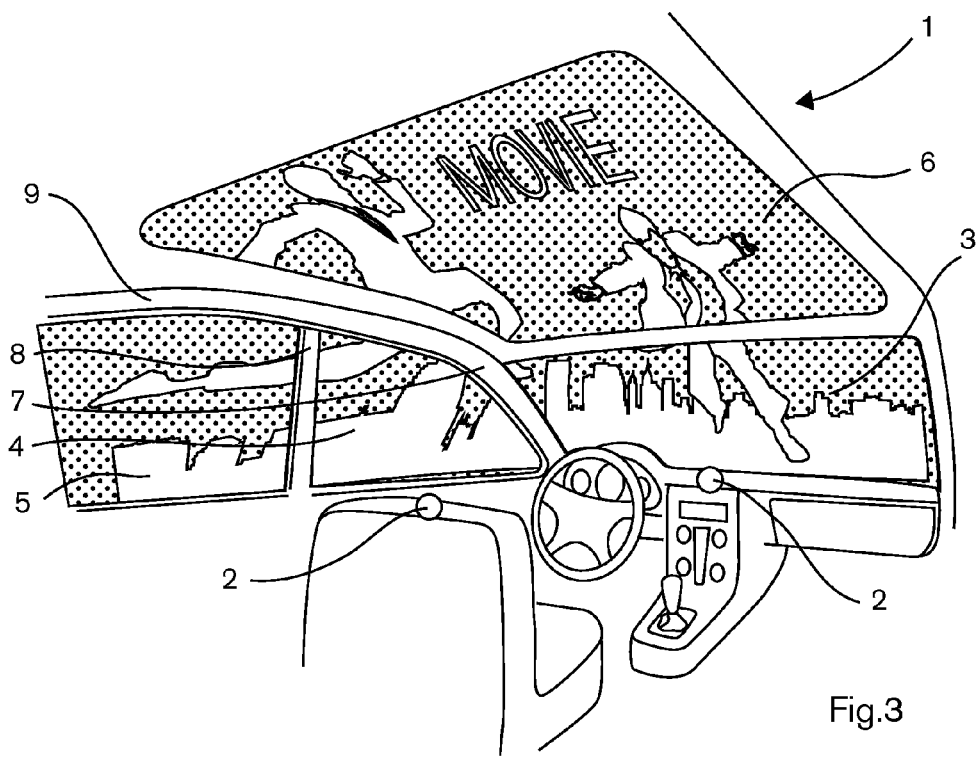

In FIG. 3 is shown when the image projecting system 2 is used to project a movie on the roof 6 and the surfaces corresponding to the front windshield window glass 3, front side window glass 4 and rear side window glass 5 such that the screen surfaces together forms the screen area onto which the movie is projected. Hence, there is the possibility to use the surfaces and shape of the interior of the vehicle to enhance a feeling of watching a 3-dimensional motion picture. As is evident are the intermediate structures, i.e. the A-pillar 7, B-pillar 8 and side roof pillar 9, not indicated as reflective screen surfaces. The intermediate structures will of course reflect images projected thereon more or less even if these surfaces not are particularly adapted to be used as screen surfaces. Depending on the desired quality of the projected images and the total size of the intermediate structures may it be considered if it is desired to include or specifically adapt these areas to better function as reflective screen areas. In this case is the projected image illustrated as a movie. The projection may of course be any desired picture or moving images, e.g. displaying a slide show of selected pictures or showing falling leaves or other images in order to provide a relaxing environment for the inactive driver and/or passengers.

Figure 4:
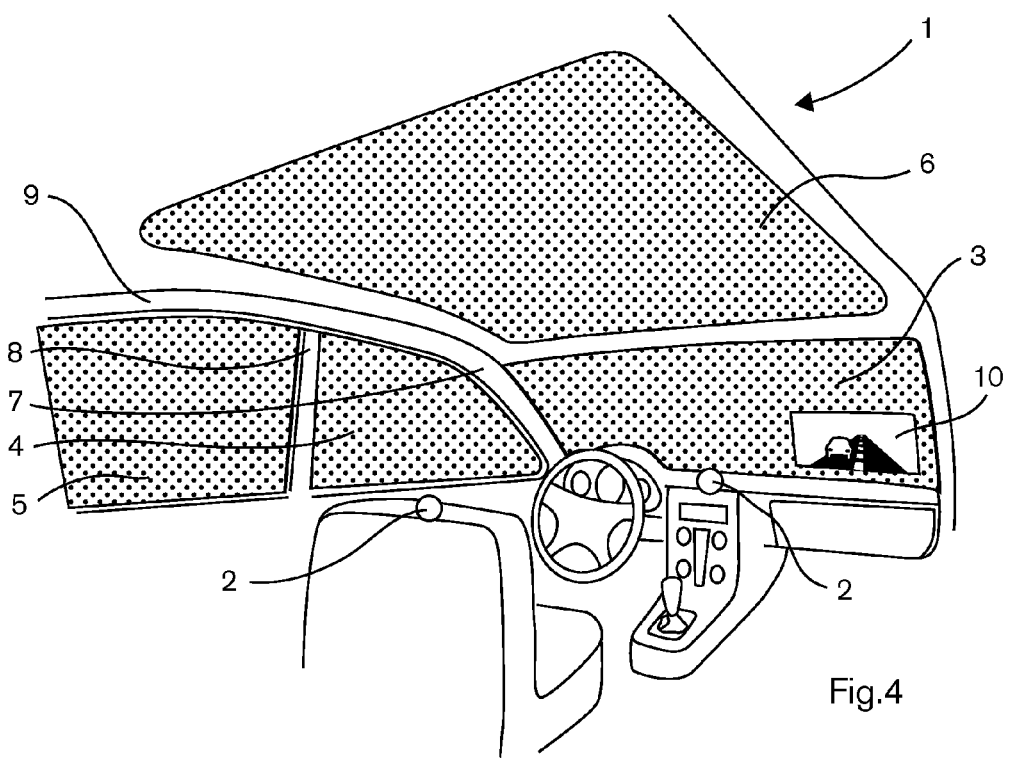

In FIG. 4 is shown how a small motion picture has been embedded in the screen area corresponding to the front windshield window 3. The embedded image is located in the lower right corner and displays a real time forward view of the outside of the vehicle 1. Hence, the major part of the screen may be used for reflecting another motion picture or slide show while it is possible to also get an image of the outside of the vehicle. The embedded image may of course show other things, e.g. displaying an image of a map using GPS for indicating the position of the vehicle or displaying other relevant data concerning the vehicle and/or the surroundings. The embedded image could also be displayed on other screen surfaces, e.g. on other parts of the front wind shield glass 3 or on the front or rear side window areas 4, 5.

The above described embodiments illustrated in FIGS. 1-4 only serves as examples on how the disclosure may be performed. The kind of images, e.g motion pictures or slides, which are shown on the screen surfaces are not essential for the inventive idea, neither the specific arrangement of the image projecting system. Likewise, there are many different ways of changing a transparent surface, e.g. a glass window, in order to modify the surface to be less transparent and better serve as a screen which may be used within the scope of disclosure. Concerning the screen, there are also other features than the transparency which are important for the visual appearance, e.g. the reflection coefficient, which also may be considered when changing the properties of a window area to function as a screen. Hence, there are a wide variety of different parameters and features which may be varied within the scope of disclosure, i.e. to modify a window glass or a surface corresponding to a window glass from being readily transparent in order to view the outside when the vehicle is driving in a first, driver dependent mode (I), to function as a reflective screen surface when the vehicle is driving in a second, driver independent, mode (II).

While exemplary embodiments are described above, it is not intended that these embodiments describe all possible forms. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A road vehicle such as a car, bus or truck, which may switch between a first, driver dependent, mode (I) in which the control of the vehicle is dependent on a driver located in the vehicle and a second, driver independent, mode (II) in which the control of the vehicle is independent of a driver located in the vehicle, the vehicle comprising:
an image projecting system for projecting a motion picture on an interior surface of the vehicle, the image projecting system including an image projecting unit; and
at least one window glass configurable to function as a screen for showing images projected by the image projecting unit;
wherein, when the vehicle is controlled in the second driver independent mode, an area of the at least one window glass is changed from readily transparent to the screen for showing images projected by the image projecting unit either by a change in a property of the window glass or covering the area of the window glass by an image reflecting surface.

2. A road vehicle according to claim 1 wherein the at least one window glass is a front windshield window glass.

3. A road vehicle according to claim 1 wherein the change in the property of the window glass comprises providing or changing an electric voltage/current to a transparency reducing means in the window glass.

4. A road vehicle according to claim 3 wherein the transparency reducing means in the window glass comprises an LCD, electrochromic film or micro-mechanical mirrors.

5. A road vehicle according to claim 1 wherein the change of the area of the at least one window glass of the vehicle from readily transparent to the screen comprises covering the area corresponding to the window glass by a sheet material screen.

6. A road vehicle according to claim 1 wherein the at least one window glass of the vehicle changes from readily transparent to the screen automatically when the vehicle driving mode is changed from its first, driver dependent mode (I) to its second, driver independent mode (II).

7. A road vehicle according to claim 1 wherein the change of the area of the at least one window glass of the vehicle from readily transparent the screen is restricted when the vehicle is in its first, driver dependent, mode (I) and controlled manually when the vehicle is in its second, driver independent, mode (II).

8. A road vehicle according to claim 1 wherein the at least one a window glass of the vehicle configurable to function as the screen comprises the front side windows and/or the rear side windows.

9. A road vehicle according to claim 8 wherein the at least one window glass of the vehicle configurable to function as the screen comprises the front windshield window, front side windows and rear side windows, which together with a vehicle roof form a concave or semi-spherical screen.

10. A road vehicle according to claim 2 wherein the image projecting system is configured to project a first motion picture on a major part of the screen formed on the area of the front windshield window glass and a second motion picture on a small area of the screen formed on the area of the front windshield screen, said second motion picture displaying a real time forward view of outside the vehicle.

11. A road vehicle such as a car, bus or truck, which may switch between a first, driver dependent, mode (I) in which the control of the vehicle is dependent on a driver located in the vehicle and a second, driver independent, mode (II) in which the control of the vehicle is independent of a driver located in the vehicle, the vehicle comprising:
an image projecting system for projecting a motion picture on an interior surface of the vehicle; and
at least one window glass configurable to function as a screen for showing images projected by the image projecting unit;
wherein, when the vehicle is controlled in the second driver independent mode, an area of the at least one window glass is changed from readily transparent to the screen for showing images projected by the image projecting system either by a change in a property of the window glass or covering the area of the window glass by an image reflecting surface.

12. An image projecting system for a road vehicle that may switch between a first, driver dependent, mode (I) in which the control of the vehicle is dependent on a driver located in the vehicle and a second, driver independent, mode (II) in which the control of the vehicle is independent of a driver located in the vehicle, the image projecting system comprising:
an image projecting unit for projecting a motion picture on an interior surface of the vehicle; and
at least one window glass adapted for use with the vehicle and configurable to function as a screen for showing images projected by the image projecting unit;
wherein, when the vehicle is controlled in the second driver independent mode, an area of the at least one window glass is changeable from readily transparent to the screen for showing images projected by the image projecting unit either by a change in a property of the window glass or covering the area of the window glass by an image reflecting surface.

13. The image projecting system of claim 12 wherein the at least one window glass is a front windshield window glass.

14. The image projecting system of claim 12 wherein the change in the property of the window glass comprises providing or changing an electric voltage/current to a transparency reducing means in the window glass.

15. The image projecting system of claim 13 wherein the transparency reducing means in the window glass comprises an LCD, electrochromic film or micro-mechanical mirrors.

16. The image projecting system of claim 12 wherein the change of the area of the at least one window glass of the vehicle from readily transparent to the screen comprises covering the area corresponding to the window glass by a sheet material screen.

17. The image projecting system of claim 12 wherein the at least one window glass of the vehicle changes from readily transparent to the screen automatically when the vehicle driving mode is changed from its first, driver dependent mode (I) to its second, driver independent mode (II).

18. The image projecting system of claim 12 wherein the change of the area of the at least one window glass of the vehicle from readily transparent the screen is restricted when the vehicle is in its first, driver dependent, mode (I) and controlled manually when the vehicle is in its second, driver independent, mode (II).

19. The image projecting system of claim 12 wherein the at least one a window glass of the vehicle configurable to function as the screen comprises the front side windows and/or the rear side windows.

20. The image projecting system of claim 13 wherein the image projecting unit is configured to project a first motion picture on a major part of the screen formed on the area of the front windshield window glass and a second motion picture on a small area of the screen formed on the area of the front windshield screen, said second motion picture displaying a real time forward view of outside the vehicle.

* * * * *

UNITED STATES PATENT AND TRADEMARK OFFICE
CERTIFICATE OF CORRECTION

| | | |
|---|---|---|
| PATENT NO. | : 8,757,807 B1 | Page 1 of 1 |
| APPLICATION NO. | : 14/103398 | |
| DATED | : June 24, 2014 | |
| INVENTOR(S) | : Jonathan Disley et al. | |

It is certified that error appears in the above-identified patent and that said Letters Patent is hereby corrected as shown below:

In the Claims:

Column 7, Lines 40-41, Claim 8:

After "the at least one" delete "a window glass of the vehicle"
and insert -- window glass of the vehicle is --.

Column 8, Lines 55-56, Claim 8:

After "the at least one" delete "a window glass of the vehicle"
and insert -- window glass of the vehicle is --.

Signed and Sealed this
Sixteenth Day of September, 2014

Michelle K. Lee
*Deputy Director of the United States Patent and Trademark Office*